Feb. 21, 1967          H. JACOBS          3,305,863
VARIABLE REFLECTOR OF ELECTROMAGNETIC RADIATION
Filed Oct. 22, 1965
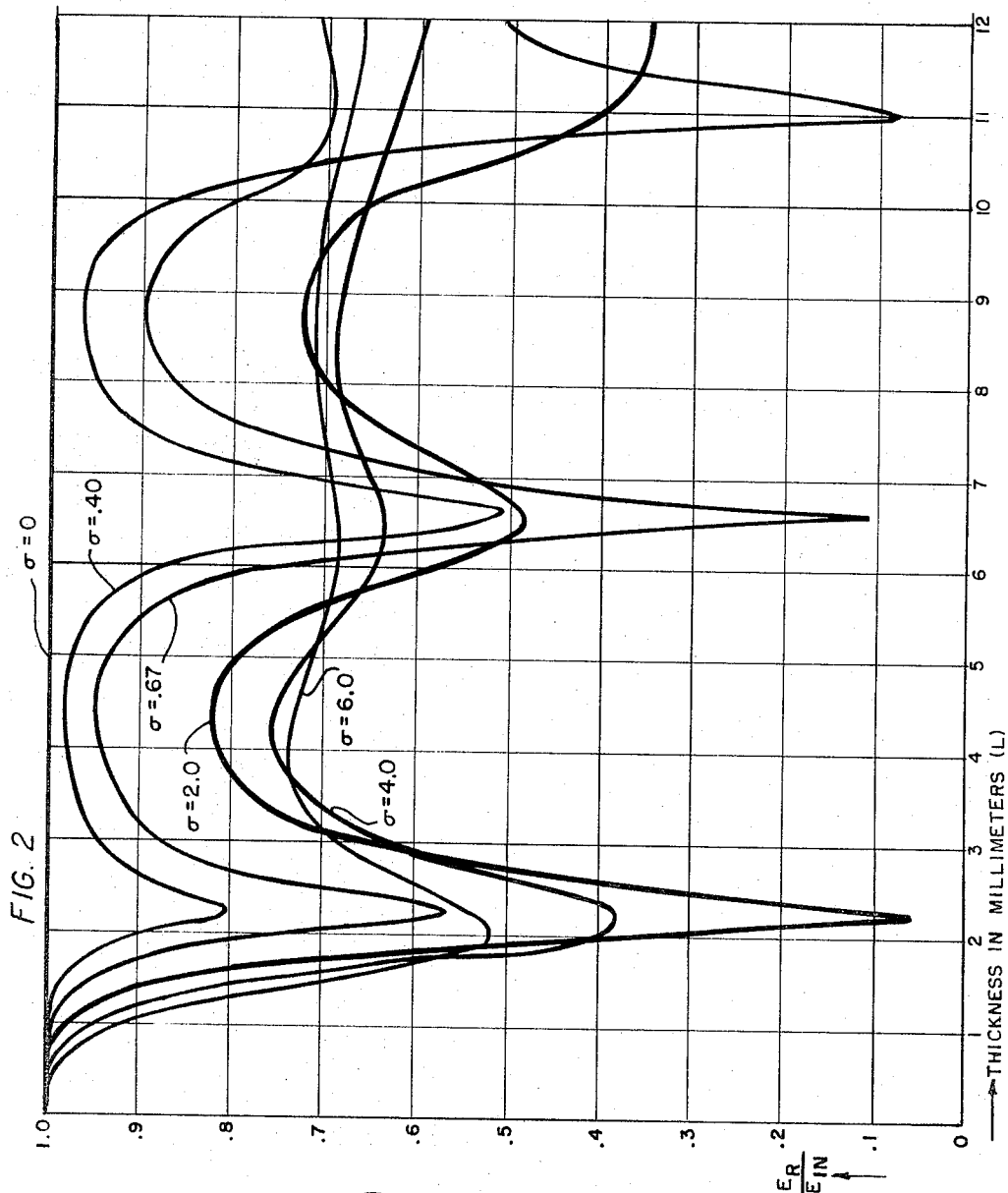
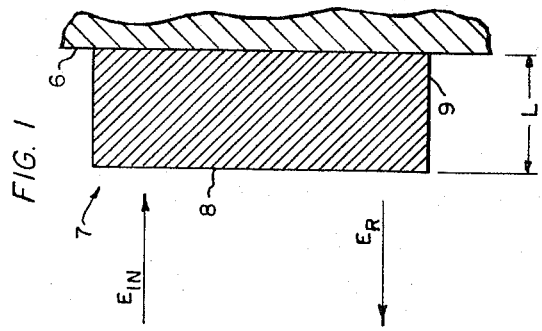
INVENTOR,
HAROLD JACOBS.
BY
ATTORNEY.

Feb. 21, 1967   H. JACOBS   3,305,863
VARIABLE REFLECTOR OF ELECTROMAGNETIC RADIATION
Filed Oct. 22, 1965   3 Sheets-Sheet 2

INVENTOR,
HAROLD JACOBS.
BY

ATTORNEY.

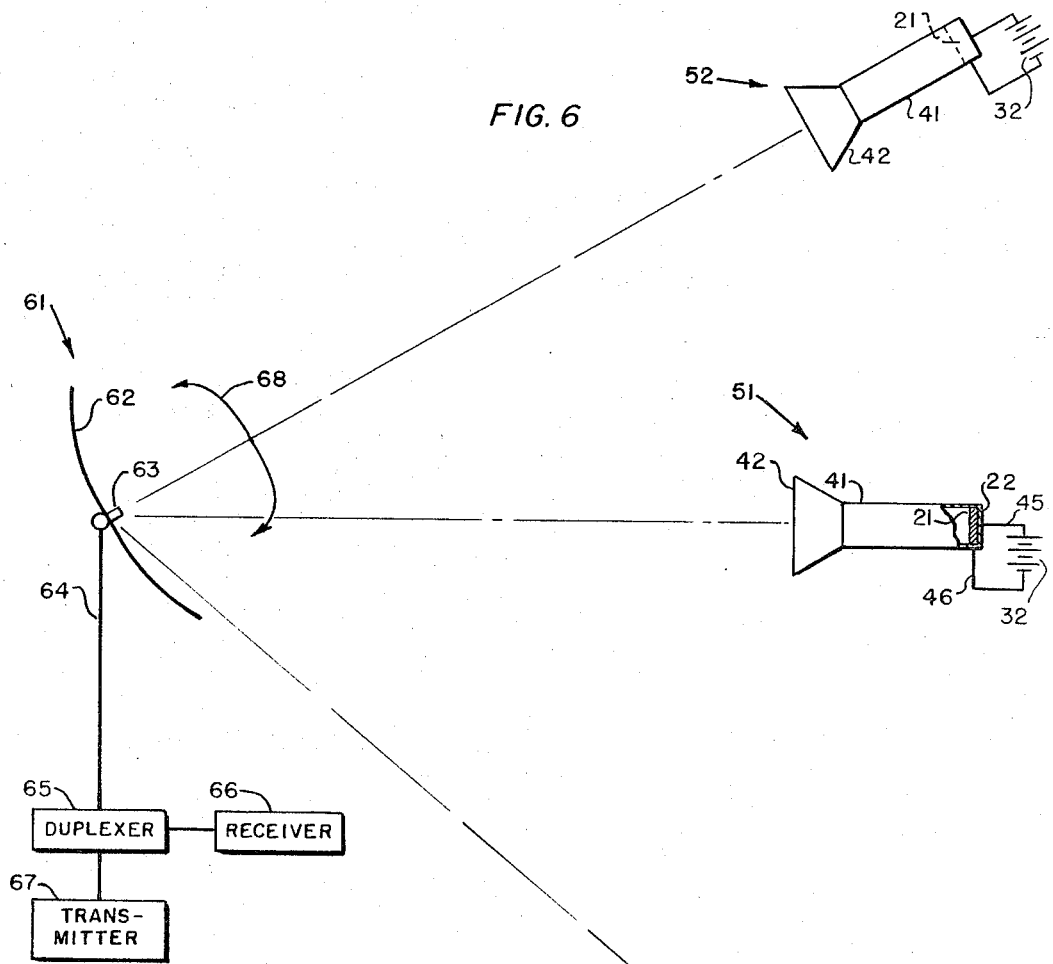
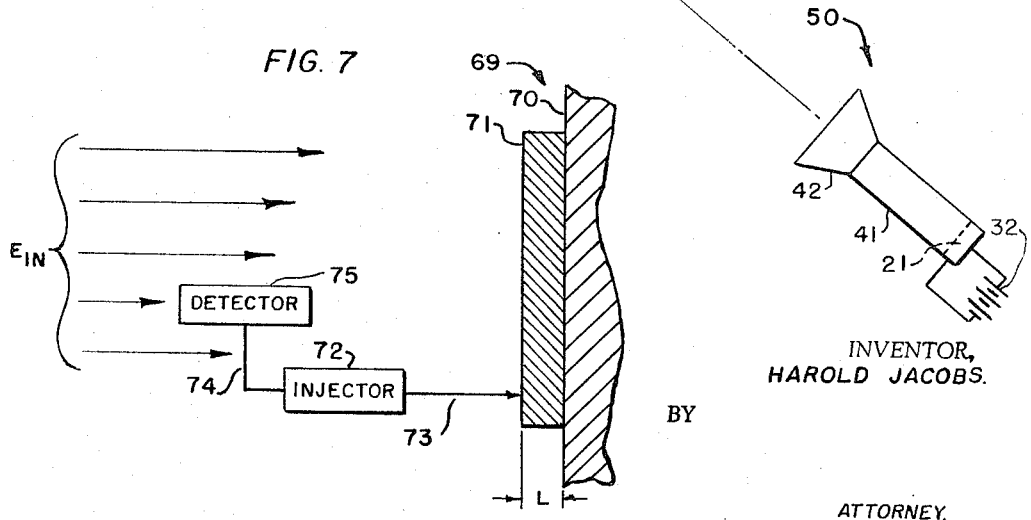

United States Patent Office 3,305,863
Patented Feb. 21, 1967

3,305,863
VARIABLE REFLECTOR OF ELECTROMAGNETIC RADIATION
Harold Jacobs, West Long Branch, N.J., assignor to the United States of America as represented by the Secretary of the Army
Filed Oct. 22, 1965, Ser. No. 504,295
14 Claims. (Cl. 343—18)

The invention described herein may be manufactured and used by or for the Government for governmental purposes without the payment of any royalty thereon.

The present invention relates to means for controlling the reflection of electromagnetic energy. Controllable reflectors find use in such diverse devices as microwave amplitude modulators, in filters, in passive transponders, and in the optical region as electronic shutters. The novel and useful reflector of the present invention comprises a slab of bulk semiconductor material mounted on a conductive metallic base, which may, for example, be the end of a short-circuited waveguide. The reflectivity of the semiconductor-coated metal base is a function of the semiconductor conductivity and the semiconductor dimensions. Microwave amplitude modulators are known in which a slab of bulk semiconductor material is placed in the path of the energy to be modulated, and the modulating signal is arranged to vary the conductivity and hence the absorption of the semiconductor. An example of such a transmission-type modulator is shown in the Jacobs et al. Patent No. 3,039,494, issued on July 2, 1963, and assigned to the Government, as is the present application. In the cited patent the path of the energy is through air, the semiconductor, and air again. Thus most of the energy with the exception of the small amounts reflected at the air-semiconductor interfaces, traverses the semiconductor only once and consequently the amount of absorption or attenuation of such a wave is limited. In the variable reflectivity device of the present invention on the other hand, much greater depth of modulation can be attained. This is believed due to a resonance effect which causes multiple reflections of the wave within the semiconductor at certain critical semiconductor thicknesses and conductivity.

Further, the range of semiconductor thicknesses in terms of the incident radiation wavelength is much greater with the reflective type structure than with the transmission type of the prior art.

It is therefore an object of the present invention to provide a novel and useful electrically variable reflector of electromagnetic energy.

Another object of the invention is to provide a reflector of electromagnetic radiation in which the absorption of incident energy in a semiconductor is maximized at certain values of semiconductor conductivity and semiconductor thickness and is minimal at other values of conductivity and thickness.

A further object of the invention is to provide a reflector comprising a semiconductor-coated metallic conductor, the reflectivity of which can be varied over a wide range by varying the semiconductor conductivity.

Another object of the invention is to provide a novel microwave amplitude modulator utilizing the variable reflector of the present nvention.

A further object of the invention is to provide an improved microwave transponder utilizing the principles of the present invention.

A further object of the invention is to provide a novel and useful navigation system including semi-passive transponders constructed according to the principles disclosed herein.

Still another object of the invention is to provide a novel electronic shutter which operates on the principle of reflectivity change.

These and other objects and advantages of the present invention will become apparent from the following detailed description and drawings, in which:

FIG. 1 is a schematic diagram of the variable reflector of the present invention.

FIGS. 2 and 3 are graphs illustrating the mode of operation of the present invention.

FIGS. 4–7 illustrate several practical applications of the novel reflector of FIG. 1.

FIG. 1 shows a slab 7 of semiconductor material mounted on a metallic conductive base 6. $E_{in}$ represents incident electromagnetic radiation substantially normal to the air-semiconductor interface 8 and $E_R$ represents the reflected radiation. It can be shown both mathematically and experimentally that at low values of semiconductor conductivity the reflection coefficient or the ratio of $E_R$ to $E_{in}$ will vary with conductivity and the thickness, L, of the semiconductor in terms of the radiation wavelength. At semiconductor thicknesses of one-quarter wavelength and odd multiples thereof, the reflection is minimized and at one of these points the reflection coefficient approaches zero at a certain value of conductivity. Thus a large depth of modulation can be achieved by proper choice of these two semiconductor parameters. The semiconductor conductivity can be varied in any convenient manner, for example by the injection or extraction of excess minority carriers by applying a bias to a pair of contacts on opposite sides of the slab 7 or by irradiating the slab with light as illustrated in the cited Jacobs et al. patent.

Figure 5A:
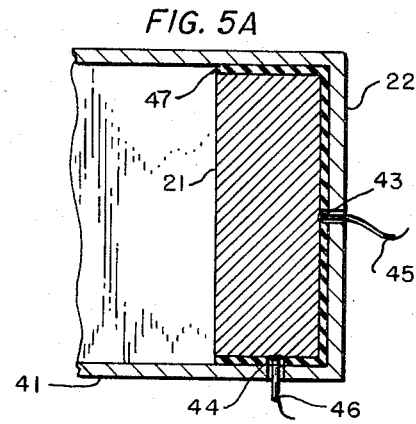
Figure 5:
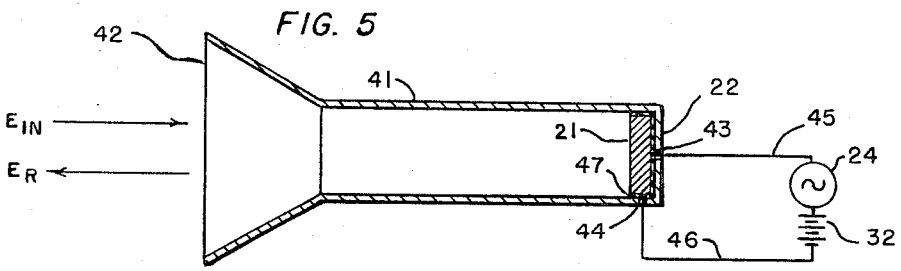

FIG. 2 is a graph illustrating how the reflectivity varies as a function of both semiconductor conductivity and thickness, L, for a slab of silicon mounted at the end of a short-circuited waveguide, such as shown in FIG. 5. The reflection coefficient $E_R/E_{in}$ is plotted against the thickness of the semiconductor in millimeters for six values of semiconductor conductivity ($\sigma$) ranging from 0 to 6.0 (ohm-meters)$^{-1}$. The frequency of operation is $10^{10}$ c.p.s., which results in a free space wavelength of 30 millimeters (mm.) and a wavelength of approximately 8.7 mm. within the silicon slab. It can be seen from FIG. 2 that the reflection coefficient is 1.0 representing 100% reflection at $\sigma=0$. At zero conductivity there is no loss in the semiconductor and all of the incident energy is reflected from the metallic base. The curve for $\sigma=2.0$ reaches a minimum reflectivity at a thickness of 2.2 mm. This thickness is approximately one quarter of the wavelength within the semiconductor. The minimum of the $\sigma=2.0$ curve is a reflection coefficient of .05. Thus, by modulating the conductivity of a 2.2 mm. thick slab of silicon between the limits of 0 and 2.0 (ohm-meter)$^{-1}$, the strength of the reflected electric field can be varied by a factor of 20 to 1. This represents a power reflection change of 400 to 1, since power is proportional to the square of the electric field strength. The $\sigma=.67$ curve of FIG. 2 reaches a minimum at 6.6 mm. and the $\sigma=.40$ curve has its minimum reflectivity at 11 mm. These thicknesses are seen to fall at the three quarter and five quarter wavelengths, respectively. At greater thicknesses, not shown in FIG. 2, other minima will be obtained at smaller values of conductivity.

It can be shown mathematically that the minimum reflectivity in terms of semiconductor thickness L, conductivity ($\sigma$) and other parameters is given by the following formula:

$$\text{Tanh}\frac{\sigma\eta}{2}L=\frac{1}{\sqrt{\epsilon_R}} \quad (1)$$

wherein $\eta$ is the impedance of the infinite semiconductor and $\epsilon_R$ is the dielectric constant thereof. This formula yields the optimum length for maximum absorption, or minimum reflectivity, at any given conductivity and also the optimum conductivity for any given length. In practice, if it is desired to operate at a given maximum conductivity, Equation 1 would be solved for L and then the semiconductor length would be cut to the odd quarter wavelength nearest to the calculated value of L. Thus, at a given operating frequency, semiconductor material and thickness, the conductivity can be chosen to yield optimum performance, and conversely, if the frequency, semiconductor material and conductivity are given or fixed, one can choose the optimum thickness at odd quarter wavelengths to get minimum reflectivity.

This flexibility in the choice of thicknesses and conductivity is an important advantage of the variable reflector of the present invention over prior art devices. For example, at the higher frequencies of incident radiation in the infra-red or optical regions, the first few odd quarter wave lengths would yield an extremely small thickness of semiconductor which may be impractical to fabricate. It can be seen from FIG. 2 that this problem can easily be avoided by lowering the conductivity to a point where the thickness would be a practical value.

Figure 3:
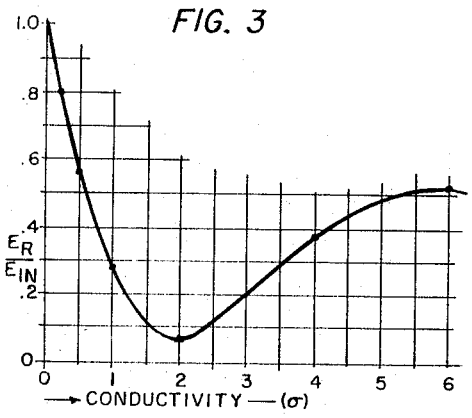

FIG. 3 is a curve of conductivity vs. reflection coefficient derived from the curves of FIG. 2 for a silicon slab of one quarter wavelength thickness at a frequency of $10^{10}$ c.p.s. It can be seen that the curve is a double-valued one and if the device is to be used as a modulator, the conductivity should be fixed biased into one of the substantially linear regions thereof, for example between 0 and 1 (ohm-meters)$^{-1}$, or between 3 and 4 (ohm-meters)$^{-1}$, and the modulating signal would then vary the conductivity around the fixed bias.

It should be noted that the curves of FIGS. 2 and 3 apply only to silicon at the end of shorted waveguide at $10^{10}$ c.p.s. With different semiconductor material, different curves will be obtained. The precise reason for the unexpectedly high absorption of energy within the metal-backed semiconductor can be explained by complex transmission line theory, however, a physical explanation of this phenomena is that a resonant effect causes a major portion of the incident energy to become trapped and hence to repeatedly traverse the semiconductor at certain critical values of thickness and conductivity. These multiple reflections cause the waves to rapidly attenuate.

Figure 4:
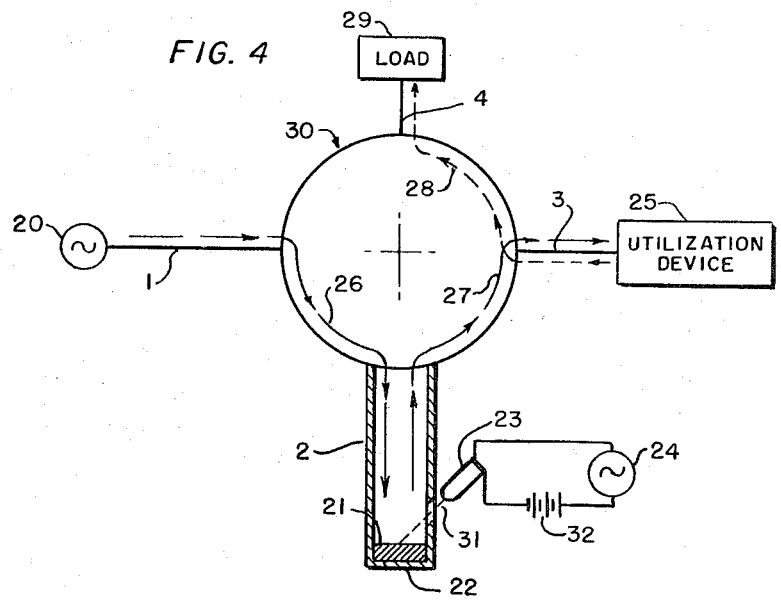

FIG. 4 illustrates how the variable reflector of FIG. 1 may be utilized in a microwave amplitude modulator. The microwave circulator 30 shown therein includes arms 1, 2, 3 and 4. The mode of operation is such that energy entering the circulator from any one of the waveguide arms thereof will travel only in the counterclockwise direction. A source of unmodulated microwave energy 20 is applied to arm 1. This energy follows the path indicated by the arrow 26 and enters arm 2. Arm 2 is a short-circuited waveguide with a slab 21 of semiconductor material mounted at its shorted end. The waveguide end 22 forms the metallic base corresponding to the base 6 of FIG. 1. An external light source 23 has its beam 31 directed through a hole in the side of the waveguide 2 to the surface of the semiconductor slab 21.

A source of modulating signal 24 varies the intensity of the light from 23 and hence modulates the conductivity and reflectivity of the semiconductor in a manner already explained. The battery 32 provides a source of fixed bias for lamp 23. The thickness of the slab 21 is related to the wavelength of the source 20 as explained above. The arrow 27 represents the energy reflected from the metal-backed semiconductor slab and this energy will be amplitude modulated in accordance with the modulating signal 24. The modulated energy continues around the circulator to arm 3, which is the output arm which is connected to utilization device 25, which may be a microwave antenna. Arm 4 of circulator 30 is terminated in a matched load 29 which absorbs any reflections from the output arm 3. This reflected energy is indicated by the dashed arrow 28.

The apparatus of FIG. 4 can also function as a variable microwave attenuator with only minor modifications. If the modulation source 24 is eliminated and fixed battery 32 made variable, the reflectivity of the semiconductor 21 will be a function of the battery voltage setting.

FIGS. 5 and 5a show an application of the novel variable reflector of the present invention as a semi-passive communication system or as a frequency shift reflection system. This embodiment comprises simply a short-circuited waveguide 41 with a horn antenna 42 at the open end thereof and a semiconductor slab 21 at the shorted end 22 thereof. In this embodiment the conductivity is controlled by injecting or extracting excess minority carriers by means of a pair of biased contacts 43 and 44. With such conductivity control it is necessary to insulate the slab 21 from the waveguide walls. This insulation may be provided by a thin layer of mica or other insulation 47. Rectifying contact 43 is centered at the rear of the slab 21 and ohmic contact 44 at the bottom thereof. Fixed bias battery 32 and modulating signal source 24 are connected across the contacts by means of leads 45 and 46 as shown in FIG. 5a and vary the conductivity in a known fashion by varying the number of excess minority carriers within the semiconductor. The position of the rectifying contact at the center of the slab 21 makes possible a uniform and rapid flooding of this area with excess minority carriers, which determine conductivity. Since the electric field strength is highest in the center of the waveguide this contact arrangement yields efficient and rapid modulation of the reflectivity. Alternatively, the slab 21 may be a PIN (position-intrinsic-negative) semiconductor, in which case both of the contacts 43 and 44 would be rectifying contacts and injection or extraction would occur at both contacts. The incident energy $E_{in}$ may represent a remote interrogating signal. If the modulating signal 24 is an audio or voice signal, the reflected wave $E_R$ will be modulated in accordance therewith. This device would be useful for battlefield communications wherein the remote signal $E_{in}$ would be sent out by a central command post and the equipment of FIG. 5 would be carried by patrols. The modulated reflected signal would be picked up at the command post or elsewhere. Thus microwave communication would be possible without the use of any bulky microwave generating equipment, but merely by modulating the reflectivity of the semiconductor which requires only simple low frequency, low power circuitry.

The device of FIG. 5 may also be used as a frequency shift reflection system, such as described in the Chisholm Patent No. 3,108,275, issued on October 22, 1963. In this case the modulating signal 24 would be a fixed frequency and the reflected signal would contain the frequency of the incoming radiation $E_{in}$, plus the sidebands equal to the incoming frequency plus and minus the modulating frequency.

FIG. 6 illustrates how several semi-passive transponders similar to those of FIG. 5 may be used in a navigation system. The elements of the three transponders 50, 51 and 52 bearing the same reference numerals as those of FIG. 4 perform the same function. Only the fixed bias batteries 32 are connected across the semiconductors 21 in the transponders of FIG. 6. The dimensions of the three semiconductor slabs 21 and the fixed bias provided by the batteries 32 are chosen so that each of the transponders exhibits a minimum reflectivity at a different frequency none of which are harmonically related and which are in the microwave region. In such a navigation system the three transponders may be located at different fixed points, for example on buoys, on mountain tops, or around airports. The frequency-dependent reflectivity characteristics thereof may be utilized by ships or aircraft to identify the transponders by means of a microwave interrogation signal, thereby obtaining a fix.

One form of an interrogating radar for use in such a system is indicated generally by the numeral 61 in FIG. 5. This radar would be carried by an aircraft or ship and is more or less conventional, including a rotatable antenna comprising dish 62 and feed 63. The transmitter is connected to the antenna through duplexer 65 which serves to isolate the receiver 66 from the transmitter, in known fashion. The transmitter 67 is made tunable in frequency over a band which includes all the frequencies at which the transponders 50, 51 and 52 are arranged to have minimum reflectivity. In operation, the interrogation radar 61 would scan the general area of the three transponders with a transmitted frequency substantially different from any of the frequencies at which any of the transponders exhibit minimum reflectivity. Since the reflectivity of the transponders will be substantial at such frequencies, the radar can obtain the bearing and range of any of the transponders by this means. Once a transponder is located in this fashion, the scanning action would be halted and the transmitter frequency would be varied until a null or minimum of the reflected signal picked up by the radar receiver 66 obtains. The frequency at which the null is obtained serves to identify to the radar operator the particular transponder on which the radar is trained. Since the locations and null frequencies of all of the transponders would appear on charts, an accurate fix could be obtained by a radar sighting of one more of the spaced transponders. It should be noted that if the compass bearing of the radar antenna is known, a fix can be obtained by a radar sighting of a single transponder. If not, two transponders must be sighted and the position of the radar determined from the intersection of the two lines of position obtained thereby.

The modulators, attenuators, and transponders described above will also operate at optical wavelengths provided the mean free time between collisions is small and the band gap of the semiconductor is large enough so that free carriers are not created from the filled band to the conduction band by the incident radiation. Further, in varying the reflectivity of incident visible radiation, it would be necessary to utilize a translucent semiconductor such as silicon carbide or gallium phosphide.

FIG. 7 illustrates one optical application of the present invention in the form of an electronic shutter. This device may be used for example to view an area from which a dangerously high intensity light beam, for example a laser beam, may emanate. The reflector 69 comprises a slab 71 of translucent semiconductor material mounted on a base 70 of high optical reflectivity. Under normal conditions the reflectivity of 69 is high, so that an observer may keep a battlefield or other area under surveillance by observing the reflected image thereof. The detector 75 intercepts a portion of the incoming radiation $E_{in}$. Detector 75 will produce an output on lead 74 if the incoming radiation exceeds a predetermined value. The injector 72, when triggered by a signal on lead 74, irradiates the semiconductor 71 with energy 73 which exceeds the semiconductor band gap and therefore changes the semiconductor conductivity and reflectivity. The strength of the radiation from injector 72 is adjusted so that the conductivity change is sufficient to minimize the reflection from 69, thus protecting the observer from eye injury due to an incident laser beam, or other source of high intensity radiation.

While the invention has been described in connection with illustrative embodiments, the inventive concepts disclosed herein are of general application and other uses of the invention will be obvious to those skilled in the art. Therefore, the invention should be limited only by the scope of the appended claims.

What is claimed is:

1. A variable reflector of electromagnetic radiation comprising a slab of bulk semiconductor material mounted on a conductive metallic base, and conductivity modulation means coupled to said semiconductor to vary the reflectivity of said reflector.

2. The apparatus of claim 1 wherein said means comprises a source of radiation having energy quanta equal to or greater than the band gap of said semiconductor, whereby excess minority carriers are produced within said semiconductor by said radiation.

3. The apparatus of claim 1 wherein said means comprises a pair of biased contacts, one of said contacts being an ohmic contact and the other being a rectifying contact, said rectifying contact being centrally located at the interface of said semiconductor and said conductive metallic base.

4. The apparatus of claim 1 wherein said semiconductor material is of PIN type with a pair of biased rectifying contacts connected thereto, one of said contacts being centrally located at the interface of said semiconductor and said conductive metallic base.

5. The apparatus of claim 3, wherein said contacts are biased by means of a serially connected source of fixed bias and an alternating reflectivity modulation signal.

6. A variable reflector of electromagnetic radiation comprising a reflective base on which is mounted a slab of bulk semiconductor material, conductivity modulation means coupled to said material to vary the reflectivity thereof, the thickness of said material being an odd quarter wavelength of said radiation.

7. A variable reflector of electromagnetic radiation comprising a length of waveguide short-circuited at one end and with a horn antenna at the other end thereof, a slab of bulk semiconductor material mounted at the shorted end of said waveguide, the thickness of said material being an odd quarter wavelength of the radiation to be reflected, and means coupled to said material to modulate the conductivity thereof in accordance with a desired amplitude modulation of the reflected signal.

8. A semi-passive transponder comprising a length of waveguide shorted at one end and having a horn at the other end, a slab of semiconductor material mounted at said shorted end, means to direct a remote signal toward said horn, said material having a thickness equal to an odd quarter wavelength of said remote signal, and means to modulate the conductivity of said material in accordance with a signal to be reflected toward the source of said remote signal.

9. A microwave amplitude modulator comprising a circulator, said circulator comprising a first arm to which a source of unmodulated microwave energy is applied, a second short-circuited arm with a semiconductor slab at the shorted end thereof, said slab having a thickness equal to an odd quarter wavelength of said microwave energy, means coupled to said slab to modulate the conductivity thereof, and a third arm having a utilization device connected thereto.

10. The modulator of claim 8 wherein said circulator further comprises a fourth arm for absorbing reflections from said utilization device.

11. A navigation system comprising a plurality of semi-passive transponders located at spaced points, each of said transponders comprising a metal-backed semiconductor slab, the thicknesses of each of said slabs being different, a conductivity biasing means connected to each of said slabs whereby each of said transponders exhibits a minimum reflectivity at a different frequency, a pulse radar set having a transmitter tunable over a band including said different frequencies, whereby any of said transponders may be identified by means of its frequency of minimum reflectivity and the range and bearing of any of said transponders may be determined at other frequencies at which the transponder reflectivity is substantial.

12. The method of determining position relative to a plurality of fixed transponders having different frequency-dependent reflectivity characteristics comprising, determining the range and bearing of at least one of said transponders by means of a pulse radar signal having a frequency at which said one of said transponders has substantial reflectivity and identifying said transponder by varying the frequency of said pulse radar signal until a null is obtained in the reflected signal.

13. An optical variable reflector comprising a translucent semiconductor material mounted on a base of high optical reflectivity, the thickness of said material being an odd quarter wave of the incident optical radiation, and means coupled to said material to vary the conductivity and hence the reflectivity thereof.

14. An electronically controllable optical shutter comprising a translucent semiconductor material mounted on a base of high optical reflectivity, the thickness of said material being an odd quarter wavelength of the incident optical radiation to be controlled, the band gap of said material being greater than the quanta of energy of said incident optical radiation, a detector in the path of said incident radiation, said detector producing an output for incident radiation in excess of a predetermined intensity, and means controlled by said detector output to irradiate said semiconductor material with electromagnetic energy equal to or exceeding the band gap of said semiconductor material, whereby the conductivity thereof is varied to control the reflectivity of said shutter.

No references cited.

CHESTER L. JUSTUS, *Primary Examiner.*

D. C. KAUFMAN, *Assistant Examiner.*